United States Patent
Hodoya et al.

(10) Patent No.: US 8,308,184 B2
(45) Date of Patent: Nov. 13, 2012

(54) TOWING HOOK MOUNTING MEMBER AND BUMPER MECHANISM WITH THE SAME

(75) Inventors: Kohei Hodoya, Toyota (JP); Shinichi Haneda, Anjo (JP); Masashi Neo, Toyota (JP); Kiyoichi Kita, Takaoka (JP)

(73) Assignees: Aisin Seiki Kabushiki Kaisha, Kariya-shi, Aichi-ken (JP); Aisin Keikinzoku Kabushiki Kaisha, Toyama-ken (JP)

( * ) Notice: Subject to any disclaimer, the term of this patent is extended or adjusted under 35 U.S.C. 154(b) by 303 days.

(21) Appl. No.: 11/808,856

(22) Filed: Jun. 13, 2007

(65) Prior Publication Data

US 2008/0001383 A1 Jan. 3, 2008

(30) Foreign Application Priority Data

Jun. 30, 2006 (JP) ................. 2006-181796

(51) Int. Cl.
*B60D 1/04* (2006.01)
*B60D 1/56* (2006.01)

(52) U.S. Cl. ............... 280/495; 280/500; 293/117

(58) Field of Classification Search ............... 280/500, 280/502, 501, 505, 495, 762; 293/117
See application file for complete search history.

(56) References Cited

U.S. PATENT DOCUMENTS

| | | | |
|---|---|---|---|
| 2,753,193 A | 7/1956 | Halverson | |
| 5,716,066 A * | 2/1998 | Chou et al. | 280/501 |
| 6,382,654 B1 * | 5/2002 | Mahncke | 280/491.1 |
| 6,402,179 B1 * | 6/2002 | Morris et al. | 280/495 |
| 6,604,884 B1 * | 8/2003 | Ohkura | 403/187 |
| 6,702,347 B1 * | 3/2004 | Hollinger et al. | 293/155 |
| 6,896,281 B2 * | 5/2005 | Lenzen et al. | 280/495 |
| 7,472,919 B2 * | 1/2009 | Pratt et al. | 280/480.1 |
| 7,758,060 B2 * | 7/2010 | Lopez et al. | 280/495 |
| 2004/0202519 A1 | 10/2004 | Kim | |
| 2005/0212311 A1 * | 9/2005 | Haneda et al. | 293/117 |
| 2005/0236809 A1 | 10/2005 | Haneda | |

FOREIGN PATENT DOCUMENTS

| | | |
|---|---|---|
| DE | 42 17 635 | 1/1993 |
| DE | 10 2004 056 249 A1 | 5/2006 |
| JP | 2001-63498 | 3/2001 |
| JP | 2002-53065 | 2/2002 |
| JP | 2002053066 * | 2/2002 |
| JP | 2004-338666 | 12/2004 |
| JP | 2005-186846 | 7/2005 |
| JP | 2006-36158 | 2/2006 |

OTHER PUBLICATIONS

Annex to European Search Report dated Dec. 19, 2007.
Japanese Office Action dated Apr. 14, 2011.

* cited by examiner

*Primary Examiner* — Anne Marie M Boehler
(74) *Attorney, Agent, or Firm* — Finnegan, Henderson, Farabow, Garrett & Dunner, LLP

(57) ABSTRACT

A towing hook mounting member includes: a plate shaped portion having an attachment means for removably attaching a tow hook to a vehicle. The towing hook mounting member is adapted to be fixedly mounted to a bumper wall of a bumper reinforcement and a supporting wall of a vehicle attachment supporting the bumper reinforcement in a manner that the plate shaped portion, the bumper wall and the supporting wall overlap one another.

7 Claims, 2 Drawing Sheets

TOWING HOOK MOUNTING MEMBER AND BUMPER MECHANISM WITH THE SAME

CROSS REFERENCE TO RELATED APPLICATIONS

This application is based on and claims priority under 35 U.S.C. §119 to Japanese Patent Application 2006-181796, filed on Jun. 30, 2006, the entire content of which is incorporated herein by reference.

FIELD OF THE INVENTION

This invention relates generally to a mounting structure of a towing hook, which mounting structure attaches the towing hook to be attachable and detachable to a vehicle.

BACKGROUND

Towing hooks, which are employed to tow vehicles, have been detachable so as to be attached to the vehicles only when the vehicles are towed. In such mounting structures of the towing hooks, a nut is welded to an end of a side-member of a vehicle body and a towing hook, which possesses a length so that a distal end of the towing hook projects from a bumper face, is attached to the nut. However, in a situation where a distance between the distal end of the towing hook and an attachment portion of the towing hook is long, when the towing hook is applied with load in a width direction of the vehicle, the towing hook may impact the bumper face so that the bumper face may be damaged.

In the light of the foregoing, a mounting structure of a towing hook has been suggested in order to solve the above-described matters, in which the towing hook is attached to a bumper reinforcement between a side-member of a vehicle body and a bumper face. For example, JP2001-63498A (reference 1) discloses a structure where a bracket having a threaded part is secured to a front surface of a bumper reinforcement so that a towing hook is attached to the bumper reinforcement via the bracket. Further, JP2005-186846A (reference 2) discloses a towing hook attachment structure, in which a towing hook mounting bracket is inserted into a front wall of a bumper reinforcement, and a flanged bolt is inserted from a back side of the bumper reinforcement and is threadedly engaged with the towing hook mounting bracket. The towing hook is then attached to a front wall of the towing hook mounting bracket. Still further, JP2006-36158A (reference 3) discloses a towing hook mounting structure, in which a towing hook attachment bracket and a strength member are housed inside a bumper reinforcement. The towing hook attachment bracket penetrates through front and back surfaces of the bumper reinforcement.

When the vehicle is towed via the towing hook, the towing hook bears load in longitudinal and width directions of the vehicle. Meanwhile, when the vehicle is shipped, the towing hook bears load in a downward direction of the vehicle. According to any of the above described towing hook mounting structures, the towing hook is attached to a relatively weak-structured bumper reinforcement so that the towing hook may not be firmly attached to the bumper reinforcement. In such circumstances, when the towing hook is applied with the load, the attachment portion of the towing hook may suffer deformation and damage.

Further, according to the structures disclosed in the references 2 and 3, some components are housed within a sectional area of the bumper reinforcement that serves as an energy-absorbing function. The bumper reinforcement can serve as the energy-absorbing function when being distorted in a cross-section. In such circumstances, those components disturb the cross-sectional distortion so that the bumper reinforcement cannot perform properly as the predetermined energy-absorbing function.

Still further, where a towing hook-mounting unit is secured to a bumper reinforcement by welding or the like, a predetermined welding strength may be impaired due to thermal affect.

The present invention has been made in view of the above circumstances, and provides a mounting structure of a towing hook, which mounting structure can ensure an energy-absorbing function that is achieved when a bumper reinforcement is deformed in a cross section in a collision and can protect an attachment portion of the towing hook from being bent and damaged even when the towing hook is applied with load.

SUMMARY OF THE INVENTION

According to an aspect of the present invention, a towing hook mounting member includes: a plate shaped portion having an attachment means for removably attaching a tow hook to a vehicle. The towing hook mounting member is adapted to be fixedly mounted to a bumper wall of a bumper reinforcement and a supporting wall of a vehicle attachment supporting the bumper reinforcement in a manner that the plate shaped portion, the bumper wall and the supporting wall overlap one another.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
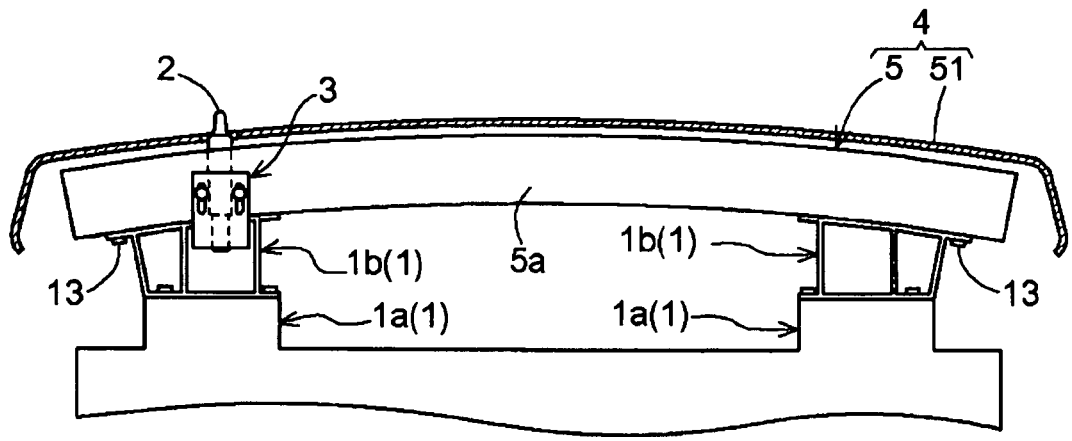
FIG. 1 is a plan view schematically illustrating a mounting structure of a towing hook according to an embodiment of the present invention.

Described below is a mounting structure of a towing hook according to an embodiment of the present invention based upon the drawings attached hereto. As illustrated in FIG. 1, a vehicle 1 includes side-members 1a, which are arranged at both left and right sides of a chassis of the vehicle 1; and bumper stays 1b, which are connected to the side-members 1a with bolt joints respectively. A bumper 4 of the vehicle 1 includes a resin-molded bumper face 51 and a bumper reinforcement 5 extruded for example from an aluminum based alloy material. It is to be understood that the bumper stays 1b posses the same general configuration and so a detailed description of one of the bumper stays 1b is described below. However, the description below applies to both bumper stays 1b.

Figure 2:
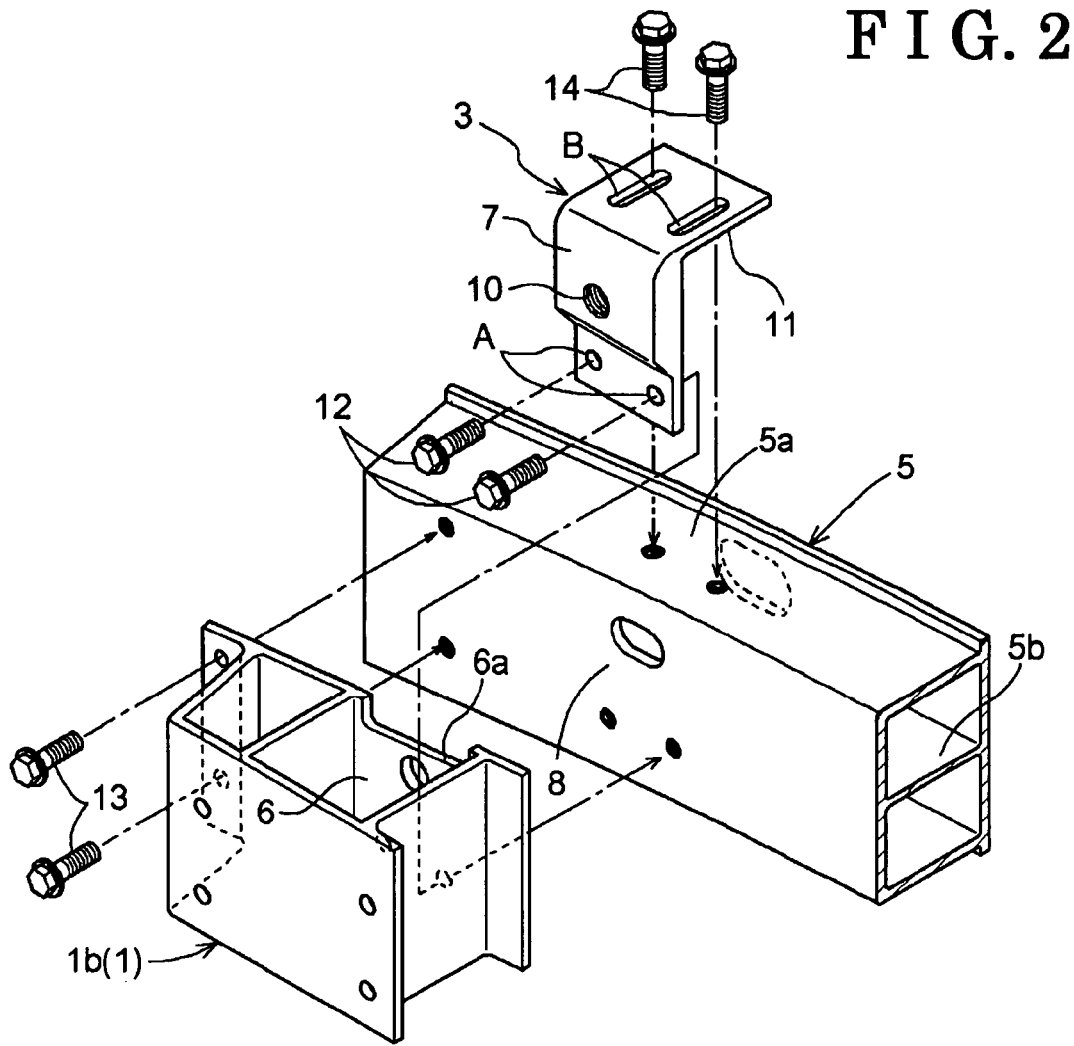
FIG. 2 is an exploded perspective view illustrating the mounting structure of the towing hook.

As illustrated in FIG. 2, the bumper reinforcement 5 is securely fastened to the bumper stay 1b (the vehicle 1) by means of a fastener 13. A towing hook 2 is inserted into openings, which are defined at the bumper face 51 and the bumper reinforcement 5 and are usually covered by a loose cover, and is firmly attached to a mounting unit 3. The towing hook 2 has one end formed to be a ring-shaped structure, to which a pull rope is secured, and the other end having external threads 9 engageable with internal threads 10 of the mounting unit 3. The towing hook 2 is easily attached to, and detached from, the mounting unit 3 and is usually stowed in an in-vehicle toolbox when being detached therefrom.

The bumper reinforcement 5 is a hollow structured member extending in a width direction of the vehicle 1. As illustrated in FIG. 2, the bumper reinforcement 5 can be provided with a stiffening portion 5*b* in the hollow space thereof. Accordingly, the bumper reinforcement 5 obtains the intended performance for energy-absorbing by being distorted in a cross-section in a collision. As illustrated in FIGS. 1 and 2, the bumper reinforcement 5 further includes a bumper wall 8, which is employed to secure the bumper stays 1*b* (the vehicle 1) to the bumper 4, and a bumper upper surface 5*a*, which comes in contact with a contact portion 11 described later. The bumper 4 is hence firmly attached to a supporting portion 6 of the bumper stay 1*b* (the vehicle 1).

Figure 3:
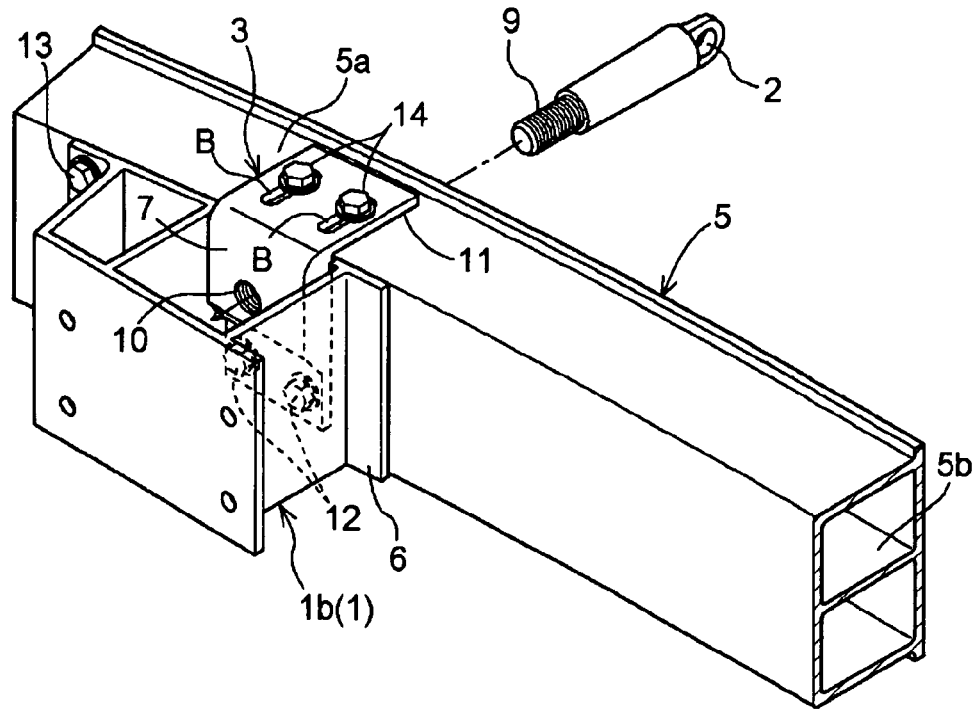
FIG. 3 is a perspective view illustrating the mounting structure of the towing hook.

The towing hook-mounting unit 3 is formed by extrusion for example from an aluminum based alloy. The towing hook-mounting unit 3 is integrated with a thick-walled plate-shaped portion 7 having an attaching means. As illustrated in FIGS. 2 and 3, the towing hook-mounting unit 3 is securely fastened as one by means of fasteners 12 in a condition where the plate-shaped portion 7 of the towing hook-mounting unit 3 is arranged overlapping attachment portions of the bumper wall 8 of the bumper reinforcement 5 and the supporting wall 6 of the bumper stay 1*b*. The towing hook-mounting unit 3 further includes through holes A into which the fasteners 12 are inserted.

As described above, the towing hook 2 is firmly attached not to a relatively weak structural bumper reinforcement 5 but to the towing hook-mounting unit 3 with a high rigidity via the attaching means of the plate-shaped portion 7. Accordingly, even when the towing hook 2 bears load applied to the vehicle 1 in a longitudinal, width or vertical direction, the above-described structure enables to protect the attachment portion of the towing hook 2 from being bended and damaged. Especially, load subjected to the towing hook 2 is received mainly by the plate-shaped portion 7 of the towing hook-mounting unit 3. However, in this case, the load is also shared and received by the bumper wall 8 and the supporting wall 6. Therefore, the attachment portion of the towing hook 2 is reinforced and is protected from being bended and damaged.

Further, as described above, the fasteners 12 are employed as fastening members that have been conventionally needed to securely fasten the supporting wall 6 and the bumper wall 8. According to the embodiment of the present invention, the fasteners 12 securely fasten the towing hook-mounting unit 3 together therewith, thus there is no need to add another fastening member for securing the towing hook-mounting unit 3 as well. This leads to reduction of the number of components assembled.

Still further, because the towing hook-mounting unit 3 is not located in the cross-sectional space of the bumper reinforcement 5, it is possible to ensure the predetermined energy-absorbing ability which is yielded by a cross-sectional distortion of the bumper reinforcement 5.

In order to overlap the plate-shaped portion 7 of the towing hook-mounting unit 3 on the attachment portions of the bumper wall 8 and the supporting wall 6, the bumper wall 8, the supporting wall 6 and the plate-shaped portion 7 are arranged in order starting from the bumper wall 8 to the supporting wall 6 and to the plate-shaped portion 7 from the bumper 4 to the vehicle 1 as illustrated in FIG. 2. According to the above-described structure, in an event where tensile load is applied to the towing hook 2 in a forward direction of the vehicle 1, the tensile load is transmitted not only to the plate-shaped portion 7 of the towing hook-mounting unit 3 but also to the supporting wall 6 and the bumper wall 8 and is then distributed to the plate-shaped portion 7, the supporting wall 6 and the bumper wall 8 respectively. Therefore, for example even if each part is designed to exhibit relatively low-leveled strength and rigidity, each part reinforce mutually, which leads to reliably resisting the tensile load.

Figure 4:
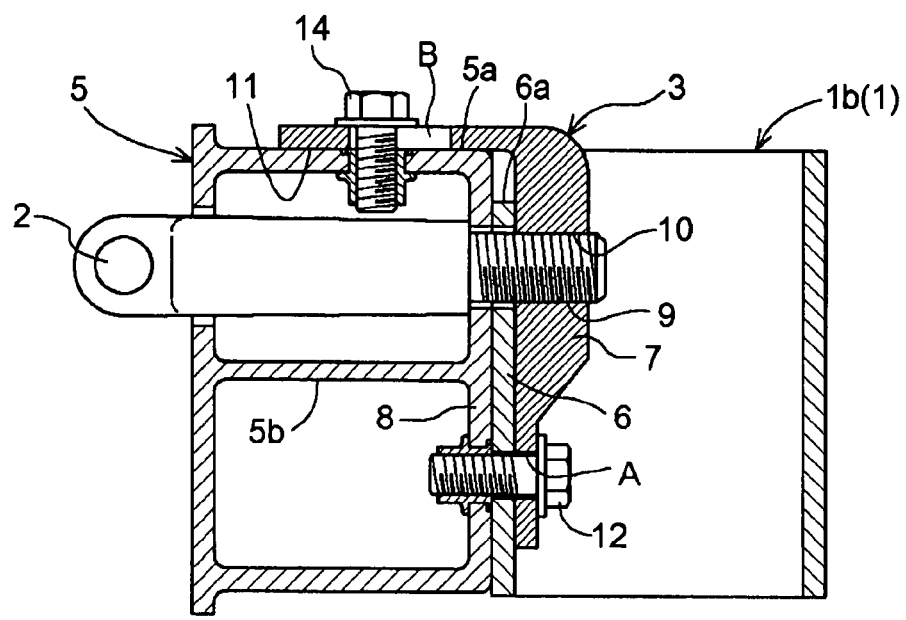
FIG. 4 is a cross sectional view illustrating an attachment portion of a towing hook-mounting unit.

The attaching means is formed at the plate-shaped portion 7 as the internal threads 10 that are engaged with the towing hook external threads 9. The attaching means employs the internal threads 10 that are easily formed, and the towing hook 2 is firmly attached to the towing hook-mounting unit 3 with the towing hook external threads 9 engaged with the internal threads 10. When the towing hook external threads 9 are engaged with the internal threads 10, a flange formed at an end of the towing hook external threads 9 comes in contact with the bumper wall 8 of the bumper reinforcement 5, as illustrated in FIG. 4. Therefore, the attachment of the towing hook 2 can be ensured.

Further, as illustrated in FIGS. 2, 3 and 4, the towing hook-mounting unit 3 exhibits an approximately L-shaped structure. One portion of the L-shaped structure includes the plate-shaped portion 7 and insertion holes A into which the fasteners 12 are inserted. The other portion of the L-shaped structure is the contact portion 11 protruding to come in contact with the bumper upper surface 5*a*. The contact portion 11 has insertion holes B, into which fasteners 14 are inserted so as to securely fasten the contact portion 11 and the bumper upper surface 5*a*. As described above, the towing hook 2 is attached to the towing hook-mounting unit 3, and, when load is applied to the towing hook 2 in a downward direction of the vehicle 1, the contact portion 11 comes in contact with the bumper upper surface 5*a* and prevents the towing hook-mounting unit 3 from moving in the downward direction of the vehicle 1.

Further, in such a case where load in the downward direction is applied to the towing hook 2, the towing hook-mounting unit 3 bears bending force in the downward direction. In such circumstances, the towing hook 2 elastically deforms the towing hook-mounting unit 3. Moreover, there is a possibility that the towing hook 2 deflects downwardly due to its predetermined length, which may impair the attachment of the towing hook 2. That is, the towing hook-mounting unit 3 is applied with a counterclockwise bending force about the internal threads 10 of the plate-shaped portion 7 (see FIG. 4). The towing hook-mounting unit 3 hence bears a bending force heading towards the supporting wall 6 at the upper side of the internal threads 10 and a bending force going away from the supporting wall 6 at the lower side of the internal threads 10. The towing hook-mounting unit 3 then elastically deforms in the directions of these bending forces, which may deteriorate attachment of the towing hook 2. However, even in such cases, according to the embodiment, the contact portion 11 comes in contact with the bumper upper surface 5*a*, which prevents an elastic deformation of the towing hook-mounting unit 3 that may be created due to the bending force.

As described above, even when the towing hook 2 is subjected with a downward load, strength and rigidity of the towing hook-mounting unit 3 is enhanced and attachment of the towing hook 2 to the vehicle 1 is reliably ensured.

Further, the contact portion 11 is securely fastened to the bumper upper surface 5*a* with bolts as the fasteners 14 inserted into the insertion holes B. According to this structure, even when the towing hook 2 is applied with load in the upward direction of the vehicle 1, it is possible to prevent the towing hook-mounting unit 3 from moving upwardly, wherein strength and rigidity of the towing hook-mounting unit 3 is improved and the attachment of the towing hook 2 to the vehicle 1 is ensured.

As illustrated in FIG. 2, it is preferable that the insertion holes B are long holes. In this case, the fasteners 14 can travel within the long holes in the event of a collision and a cross-sectional distortion of the bumper reinforcement 5 is not disturbed. Therefore, the bumper reinforcement 5 can exert the predetermined energy-absorbing performance. Further, it is preferable that the length of each long hole is designed in a manner that a projection of the bumper upper surface 5a does not impact the towing hook-mounting unit 3 due to the distortion of the bumper reinforcement 5 in a collision (see FIG. 4).

Another Embodiment

According to the above embodiment, the towing hook external threads 9 and the internal threads 10 are employed as the attaching means. Alternatively, any other structure is appropriate as the attaching means as far as attaching the towing hook 2. For example, a projection extending radially outwardly can be formed at an end of the towing hook 2, and an engagement portion that is engaged with the projection can be formed at the towing hook attachment unit 3. Here, the attaching means is established by rotatably inserting the towing hook 2 into the engagement portion and by engaging the projection with the engagement portion.

According to the above embodiment, the attaching means employs the internal threads 10 formed at the plate-shaped portion 7 of the towing hook-mounting unit 3. Alternatively, external threads can be formed at the plate-shaped portion 7, which are engaged with internal threads of the towing hook 2.

According to the above embodiment, upon overlapping the plate-shaped portion 7 with the bumper wall 8 and the supporting wall 6, the bumper wall 8, the supporting wall 6 and the plate-shaped portion 7 are arranged from the bumper 4 towards the vehicle 1 in the order illustrated in FIGS. 2 and 3. However, the arrangement order is not limited to the above and they can be arranged in another order, which starts from the bumper wall 8 to the plate-shaped portion 7 and to the supporting wall 6 from the side of the bumper 4 to the side of the vehicle 1. In this case, in the event where the towing hook 2 is applied with load in a rearward direction of the vehicle 1, the load is distributed to the plate-shaped portion 7 and the supporting wall 6. Therefore, for example even if each part is designed to have a relatively low-leveled strength and rigidity and so on, each part reinforces mutually and reliably resists the load.

According to the above embodiment, the contact portion 11 comes in contact with the bumper upper surface 5a. Alternatively, the contact portion 11 can come in contact with an upper surface 6a of the supporting wall 6 of the bumper stay 1b (the vehicle 1). That is, in the case where the supporting wall 6 in FIG. 4 extends in the upward direction of the vehicle 1 and is interposed between the bumper upper surface 5a and the contact portion 11, the upper surface 6a of the bumper stay 1b comes in contact with the contact portion 11. Accordingly, the upper surface 6a replaces the upper surface 5a for preventing the towing hook-mounting unit 3 from being displaced.

According to the above embodiment, the bumper reinforcement 5 and the towing hook-mounting unit 3 are each formed of aluminum-based alloys. However, the materials thereof are not limited to the above as far as each material is a metal, an alloy or the like, which can supply a predetermined strength.

As described above, the mounting structure of the towing hook is preferably utilized as a structure which can ensure an energy-absorbing performance which is yielded by a cross-sectional distortion of the bumper reinforcement in a collision and can protect the attachment portion of the towing hook from being bended and damaged even when the towing hook is applied with load.

The towing hook is attached not to the bumper reinforcement that is relatively weak structured but to the towing hook attachment unit that is rigidly structured. Therefore, even when the towing hook is applied with load in a longitudinal, width or vertical direction of the vehicle, it is possible to prevent the towing hook from being bent and damaged at the attachment portion. Especially, although the load applied to the towing hook is received mainly by the plate-shaped portion of the towing hook attachment unit, the load is shared and supported by the bumper wall and the supporting wall as well. This leads to reinforcement of the attachment portion of the towing hook and to prevent the towing hook from being bent and damaged at the attachment portion. Further, because the towing hook attachment unit is not located in the cross-sectional space of the bumper reinforcement, it is possible to ensure a predetermined energy-absorbing function that is achieved when the bumper reinforcement is distorted in a cross section.

A second characteristic structure of the towing hook mounting member of the present invention is that the plate shaped portion includes an insertion hole for receiving a fixing member for fixedly mounting the plate shaped portion to the bumper wall and the supporting wall.

A third characteristic structure of the towing hook mounting member of the present invention is that the plate shaped portion further includes a contact portion that makes a contact with at least either an upper surface of the bumper reinforcement or an upper surface of the supporting wall.

According to the third characteristic structure, when a vehicle downward load is applied to the towing hook attached to the towing hook attachment unit, the contact portion comes in contact with at least one of the upper surface of the bumper reinforcement and the upper surface of the supporting wall. Therefore, it is possible to prevent the towing hook-mounting unit from moving in the downward direction of the vehicle. Further, in such a case where the vehicle downward load is applied to the towing hook, the towing hook-mounting unit bears bending force in the downward direction of the vehicle. In such circumstances, the towing hook elastically deforms the towing hook-mounting unit. Moreover, there is a possibility that the attachment of the towing hook is impaired due to bending in the downward direction of the vehicle because the towing hook possesses a predetermined length. However, in the case where the contact portion is in contact with the upper surface of the bumper reinforcement or the upper surface of the supporting wall, an elastic deformation of the towing hook mounting unit can be prevented. Therefore, even when the towing hook is applied with load in the downward direction of the vehicle, strength and rigidity of the towing hook-mounting unit can be improved and attachment of the towing hook to the vehicle is reliably ensured.

A fourth characteristic structure of the towing hook mounting member of the present invention is that the contact portion extends in a plane substantially perpendicular to a plane of the plate shaped portion. A fifth characteristic structure of the towing hook mounting member of the present invention is that the contact portion includes a fixing structure for securing the contact portion to the upper surface of the bumper reinforcement.

According to the fifth characteristic structure, even when load is applied to the towing hook in an upward direction of the vehicle, it is possible to prevent the towing hook attachment unit from moving in the upward direction. As a result, strength and rigidity of the towing hook attachment unit can be improved and the attachment of the towing hook to the vehicle is reliably ensured.

A sixth characteristic structure of the towing hook mounting member of the present invention is that the fixing structure is a hole extending in a longitudinal direction of the vehicle.

According to the sixth characteristic structure, a fastener can travel within the hole, so that it is possible to exert an initial energy absorbing function without blocking a cross-sectional distortion of the bumper reinforcement.

A seventh characteristic structure of the towing hook mounting member of the present invention is that the attachment means is provided at a thickened portion of the plate shaped portion.

In this case, it is possible to reliably prevent a portion, to which the towing hook is directly secured, from bending and being damaged.

An eighth characteristic structure of a bumper mechanism of the present invention is that the bumper mechanism includes: a bumper wall; a supporting wall; and a towing hook mounting member including a plate shaped portion having an attachment means for removably attaching a tow hook to a vehicle. The towing hook mounting member is adapted to be fixedly mounted to the bumper wall of a bumper reinforcement and the supporting wall of a vehicle attachment supporting the bumper reinforcement in a manner that the plate shaped portion, the bumper wall and the supporting wall overlap one another.

According to the eighth characteristic structure, the towing hook is attached not to the bumper reinforcement that is relatively weak structured but to the towing hook attachment unit that is rigidly structured. Therefore, even when the towing hook is applied with load in a longitudinal, width or vertical direction of the vehicle, it is possible to prevent the towing hook from being bent and damaged at the attachment portion. Especially, although the load applied to the towing hook is received mainly by the plate-shaped portion of the towing hook attachment unit, the load is shared and supported by the bumper wall and the supporting wall as well. This leads to reinforcement of the attachment portion of the towing hook and to prevent the towing hook from being bent and damaged at the attachment portion. Further, because the towing hook attachment unit is not located in the cross-sectional space of the bumper reinforcement, it is possible to ensure a predetermined energy-absorbing function that is achieved when the bumper reinforcement is distorted in a cross section.

A ninth characteristic structure of the bumper mechanism of the present invention is that the plate shaped portion includes an insertion hole for receiving a fixing member for fixedly mounting the plate shaped portion to the bumper wall and the supporting wall.

A tenth characteristic structure of the bumper mechanism of the present invention is that the plate shaped portion further includes a contact portion that makes a contact with at least either an upper surface of the bumper reinforcement or an upper surface of the supporting wall.

According to the tenth characteristic structure, when a vehicle downward load is applied to the towing hook attached to the towing hook attachment unit, the contact portion comes in contact with at least one of the upper surface of the bumper reinforcement and the upper surface of the supporting wall. Therefore, it is possible to prevent the towing hook-mounting unit from moving in the downward direction of the vehicle. Further, in such a case where the vehicle downward load is applied to the towing hook, the towing hook-mounting unit bears bending force in the downward direction of the vehicle. In such circumstances, the towing hook elastically deforms the towing hook-mounting unit. Moreover, there is a possibility that the attachment of the towing hook is impaired due to bending in the downward direction of the vehicle because the towing hook possesses a predetermined length. However, in the case where the contact portion is in contact with the upper surface of the bumper reinforcement or the upper surface of the supporting wall, an elastic deformation of the towing hook mounting unit can be prevented. Therefore, even when the towing hook is applied with load in the downward direction of the vehicle, strength and rigidity of the towing hook-mounting unit can be improved and attachment of the towing hook to the vehicle is reliably ensured.

An eleventh characteristic structure of the bumper mechanism is that the contact portion extends in a plane substantially perpendicular to a plane of the plate shaped portion.

A twelfth characteristic structure of the bumper mechanism is that the contact portion includes a fixing structure for securing the contact portion to the upper surface of the bumper reinforcement.

According to the twelfth characteristic structure, even when load is applied to the towing hook in an upward direction of the vehicle, it is possible to prevent the towing hook attachment unit from moving in the upward direction. As a result, strength and rigidity of the towing hook attachment unit can be improved and the attachment of the towing hook to the vehicle is reliably ensured.

A thirteenth characteristic structure of the bumper mechanism is that the fixing structure is a hole extending in a longitudinal direction of the vehicle. In this case, it is possible to exert an initial energy absorbing function without blocking a cross-sectional distortion of the bumper reinforcement A fourteenth characteristic structure of the bumper mechanism is that the towing hook mounting member is secured with the bumper wall by a fastening member that fastens the bumper wall with the supporting wall. In this case, it is possible to reliably prevent a portion, to which the towing hook is directly secured, from bending and being damaged.

The principles, of the preferred embodiment and mode of operation of the present invention have been described in the foregoing specification. However, the invention, which is intended to be protected, is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A bumper mechanism comprising:
a bumper wall;
a supporting wall; and
a towing hook mounting member including a plate shaped portion having an attachment means for removably attaching a tow hook to a vehicle;
wherein the towing hook mounting member is adapted to be fixedly mounted to the bumper wall of a bumper reinforcement and the supporting wall of a vehicle attachment supporting the bumper reinforcement in a manner that the bumper wall, the supporting wall, and the plate shaped portion are layered in such an order in a direction toward the vehicle;

wherein the plate shaped portion further includes an integral contact portion that makes a contact with at least either an upper surface of the bumper reinforcement or an upper surface of the supporting wall;

wherein the integral contact portion includes a fixing structure for securing the contact portion to the upper surface of the bumper reinforcement; and wherein the fixing structure is an elongated slot extending in a longitudinal direction of the vehicle.

2. A bumper mechanism according to claim 1, wherein the plate shaped portion includes an insertion hole for receiving a fixing member for fixedly mounting the plate shaped portion to the bumper wall and the supporting wall.

3. A bumper mechanism according to claim 1, wherein the integral contact portion extends in a plane substantially perpendicular to a plane of the plate shaped portion.

4. A bumper mechanism according to claim 1, wherein the towing hook mounting member is secured with the bumper wall by a fastening member that fastens the bumper wall with the supporting wall.

5. A bumper mechanism according to claim 1, wherein the bumper reinforcement is formed into a hollow member through which the tow hook passes.

6. A bumper mechanism according to claim 1, wherein the tow hook passes horizontally through the bumper wall and the supporting wall.

7. A bumper mechanism according to claim 6, wherein the tow hook is threaded into the plate shaped portion.

* * * * *